United States Patent
Bosch et al.

(10) Patent No.: US 6,565,979 B1
(45) Date of Patent: May 20, 2003

(54) DOUBLE-LAYER VARNISH COMPRISING AN AQUEOUS BASE VARNISH AND CLEAR VARNISH WITH IMPROVED CLEAR VARNISH WETTING LIMIT

(75) Inventors: Werner Bosch, Wuppertal (DE); Oliver Kraus Vom Cleff, Wuppertal (DE); Marco Taschner, Sprockhövel (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/786,505

(22) PCT Filed: Sep. 2, 1999

(86) PCT No.: PCT/EP99/06441
§ 371 (c)(1),
(2), (4) Date: May 14, 2001

(87) PCT Pub. No.: WO94/04616
PCT Pub. Date: Mar. 23, 2000

(30) Foreign Application Priority Data

Sep. 14, 1998 (DE) .......................................... 198 41 976

(51) Int. Cl.$^7$ ............................................... B32B 27/30

(52) U.S. Cl. ................. 428/423.1; 428/425.8; 524/81; 524/379; 524/389; 427/407.1

(58) Field of Search .......................... 428/423.1, 425.8; 524/81, 379, 389; 427/407.1

(56) References Cited

U.S. PATENT DOCUMENTS 5,290,845 A * 3/1994 Berg et al. .................. 524/443
5,985,369 A 11/1999 Kerkmann et al.

* cited by examiner

Primary Examiner—Robert Dawson
Assistant Examiner—Christopher Keehan
(74) Attorney, Agent, or Firm—Bart E. Lerman

(57) ABSTRACT

The use of linear and/or branched polyethylene oxide homopolymers, polypropylene oxide homopolymers and/or polyethylene/polypropylene oxide copolymers with randomly distributed ethylene oxide and propylene oxide units, which may be partly or completely etherified with C1–C4-alkanols, with an average molecular weight of more than 1000 to 8000, for reducing the clear lacquer wetting limits during two-layered lacquering with aqueous base lacquer/clear lacquer and suitable base lacquers.

18 Claims, No Drawings

DOUBLE-LAYER VARNISH COMPRISING AN AQUEOUS BASE VARNISH AND CLEAR VARNISH WITH IMPROVED CLEAR VARNISH WETTING LIMIT

The invention provides the preparation of two-layered lacquers of the base lacquer/clear lacquer type with improved clear lacquer wetting limits by using certain additives in aqueous base lacquers, and aqueous base lacquers suitable for this purpose. It also provides a process for preparing the two-layered lacquers using the aqueous base lacquer.

EP-A-0 281 936 discloses water-based base lacquers which contain sheet silicate dispersions prepared using polypropylene oxide as a protective colloid. The polypropylene oxides may contain ethylene oxide units in a randomly distributed form or in the form of a block copolymer structure. In the case of block copolymer polypropylene oxides, those with an average molecular weight of 500 to 8000 are suitable. However, polypropylene oxide homopolymers with an average molecular weight of 400 to 1000, very particularly preferably about 900, are preferred.

In particular in the automobile mass lacquering sector, the preparation of decorative two-layered top lacquers is increasingly being achieved by the application of a colour and/or effect providing base lacquer consisting of an aqueous base lacquer and a protective clear lacquer layer. The clear lacquer must be applied in a minimum thickness, which is predetermined by the clear lacquer wetting limits, in order to ensure the formation of a closed clear lacquer film over the entire substrate surface. This minimum thickness may even be exceeded in practice, for example to ensure the formation of a closed clear lacquer film in places which are difficult to reach by the application equipment, such as for example crimping, edges or indentations in a car body. This leads not only to an undesirably high consumption of clear lacquer but, depending on the nature of the clear lacquer, problems often also occur with the sag resistance of the clear lacquer on vertical surfaces if the thickness of the clear lacquer is too great.

EP-A-0 663 428 discloses the use of low molecular weight poly-C4-olefins as additives in water-based base lacquers in order to lower the wetting limit of the clear lacquer being applied. Stable incorporation of poly-C4-olefins in water-based base lacquers requires intensive mixing of the poly-C4-olefin with the aqueous base lacquer or the poly-C4-olefin is expediently added at a stage well before adding substantial amounts of water when preparing the water-based base lacquer.

The object of the invention is to provide water-based base lacquers for subsequent overpainting with clear lacquers which enable lowering of the clear lacquer wetting limits and application of the relevant clear lacquer layer in the thinnest possible layer and also increase process reliability when coating with the clear lacquer. The water-based base lacquer should be easy to prepare and be stable.

It was shown that this object can be achieved by using one or more polyethylene and or polypropylene glycols and/or polyols which are optionally partly or completely etherified with C1–C4-alkanols and have an average molecular weight of more than 1000 to 8000 as additives in water-based base lacquers. Therefore, the invention provides the use of linear and/or branched polyethylene oxide homopolymers, polypropylene oxide homopolymers and/or polyethylene/polypropylene oxide copolymers with randomly distributed ethylene oxide and propylene oxide units, wherein the terminal hydroxyl groups in the homopolymers or copolymers may be non-etherified or partly or completely etherified with C1–C4-alkanols, with an average molecular weight of more than 1000 to 8000 for reducing the clear lacquer wetting limits during two-layered lacquering with an aqueous base lacquer and clear lacquer. The average molecular weight mentioned is understood to be the calculated average molecular weight.

During use, the linear and/or branched polyethylene oxide homopolymers, polypropylene oxide homopolyrners and/or polyethylene/polypropylene oxide copolymers are added to the aqueous base lacquer prior to its application, preferably in a proportion of 0.5 to 15 wt. %, with respect to its solids content.

The invention also provides an aqueous base lacquer composition containing one or more binders and pigments and optionally fillers, cross-linking agents, organic solvents and/or conventional lacquer additives which is characterised in that it also contains one or more linear and/or branched polyethylene oxide homopolymers, polypropylene oxide homopolymers and/or polyethylene/polypropylene oxide copolymers with randomly distributed ethylene oxide and propylene oxide units, wherein the terminal hydroxyl groups in the homopolymers or copolymers may be non-etherified or partly or completely etherified with C1–C4-alkanols, with an average molecular weight of more than 1000 to 8000 in a proportion of 0.5 to 15 wt. %, with respect to its solids content.

The modified colour and/or effect providing water-based base lacquer according to the invention may be used during the preparation of multi-layered lacquers, in particular decorative base lacquer/clear lacquer two-layered lacquers. The waterbased base lacquers contain in an appropriate manner ionic or non-ionic stabilised binder systems. These are preferably anionic and/or non-ionically stabilised. Anionic stabilisation is preferably achieved by the presence of at least partly neutralised carboxyl groups in the binder, whereas non-ionic stabilisation is achieved by the presence of lateral or terminal polyethylene oxide units in the binder. The waterbased base lacquer may have physically drying properties or may be cross-linkable with the formation of covalent bonds. Base lacquers which cross-link with the formation of covalent bonds may be self-cross-linking systems or require the use of external cross-linking agents. In the latter case, they may be single component or multi-component water-based base lacquers.

Water-based base lacquers according to the invention contain one or more conventional film-forming binders. They may also contain cross-linking agents, if the binders are not self-cross-linking or self-drying. Neither the binders nor the optionally present cross-linking components are subject to any restrictions at all. For example, conventional polyester, polyurethane and/or poly(meth)acrylate resins may be used as film-forming binders. The choice of an optionally present cross-linking agent is not critical; it is governed in a manner which is familiar to a person skilled in the art by the functionality of the binder, that is the cross-linking agents are chosen so that they have a reactive functionality which is complementary to the functionality of the binder. Examples of such complementary functionalities between binder and cross-linking agent are: carboxyl/epoxide, hydroxyl/methylolether and/or methylol (methylol ether and/or methylol preferred as cross-linking active groups of aminoplast resins), hydroxyl/free isocyanate, hydroxyl/blocked isocyanate, (meth)acryloyl/CH-acid groups. Provided they are compatible with each other, several such complementary functionalities may also be present alongside each other in a water-based base lacquer.

The cross-linking agents which are optionally present in the water-based base lacquer may be present individually or as a mixture.

Water-based base lacquers according to the invention contain colour and/or effect providing pigments and optionally fillers. Examples of colour providing inorganic or organic pigments and fillers are titanium dioxide, micronised titanium dioxide, iron oxide pigments, carbon black, silicon dioxide, barium sulfate, micronised mica, talcum, kaolin, chalk, sheet silicates, azo pigments, phthalocyanine pigments, quinacridone pigments, pyrrolopyrrol pigments, perylene pigments. Examples of effect providing pigments are metal pigments, e.g. consisting of aluminium, copper or other metals; interference pigments such as e.g. metal oxide-coated metal pigments, e.g. titanium dioxide-coated aluminium, coated mica such as e.g. titanium dioxide-coated mica, graphite effect pigments, platelet-shaped iron oxide, platelet-shaped copper phthalocyanine pigments.

Effect pigments are generally provided in the form of a commercially available aqueous or non-aqueous paste, optionally with preferably water-dilutable organic solvents and additives added thereto, and then mixed with aqueous binder under shear. Powdered effect pigments may first be processed with preferably water-dilutable organic solvents and additives to form a paste.

Coloured pigments and/or fillers, for example, may be dispersed in some of the aqueous binder. The dispersion procedure may preferably also be performed in a special water-dilutable paste resin. Dispersion may take place in conventional equipment known to a person skilled in the art. Then final coloured pigment dispersion is completed using the remainder of the aqueous binder or aqueous paste resin.

According to the invention, it is an essential feature that the water-based base lacquer contains the previously defined polyethylene oxide homopolymers, polypropylene oxide homopolymers and/or polyethylene/polypropylene oxide copolymers. These may also be called polyethylene glycols, polypropylene glycols, polyethylene/polypropylene glycols optionally partly or completely etherified with C1–C4-alkanols or the corresponding polyols, provided in the last case that they are branched products. In the following, for simplification, the expression "polyethylene and/or polypropylene glycols and/or polyols" is chosen. These are polyethylene oxide homopolymers or polypropylene oxide homopolymers or polyethylene/polypropylene oxide copolymers with randomly distributed ethylene oxide and propylene oxide units, wherein the terminal hydroxyl groups in the homopolymers or copolymers may be non-etherified or partly or completely etherified with C1–C4-alkanols. The average molecular weight of the homopolymers or copolymers is preferably more than 1000 to 4000 in particular about 2000. They may be polyethylenepolyols and/or polypropylenepolyols with a branched structure, which can be prepared by ring-opening polymerisation of ethylene and/or propylene oxide using trifunctional or higher functional polyols as starter molecules such as, for example, trimethylolpropane, glycerine, pentaerythritol. In the context of the invention, linear polyethylene glycols and/or polypropylene glycols are preferred. These can be prepared by ring-opening polymerisation of ethylene and/or propylene oxide using water or diols as starter molecules, such as preferably ethylene glycol or propylene glycol. Homopolymer representatives are preferably used as additives in water-based base lacquers, in particular polypropylene oxide homopolyrners. The terminal hydroxyl groups of polyethylene and/or polypropylene glycols and/or polyols may be partly or completely etherified with C1–C4-alkanols such as methanol, ethanol, n-propanol, isopropanol, 1-butanol, 2-butanol, isobutanol; preferably, however, the non-etherified hydroxy-functional polyether compounds are preferred.

The polyethylene and/or polypropylene glycols and/or polyols are used in a proportion of 0.5 to 15 wt. %, preferably 1 to 10 wt. %, with respect to the solids content of the water-based base lacquer.

Incorporation of the polyethylene and/or polypropylene glycols and/or polyols may take place at any stage during preparation of the water-based base lacquer, for example also as an additive to the final water-based base lacquer itself, for example as a subsequent correction agent. Stable incorporation of the polyethylene and/or polypropylene glycols and/or polyols can be achieved in a mixing process without the use of special measures.

Water-based base lacquers according to the invention may contain further conventional lacquer additives in the amounts conventionally used in lacquers, for example between 0.1 and 5 wt. %, with respect to their solids contents. Examples of such additives are antifoaming agents, wetting agents, bonding substances, catalysts, flow control agents, anticrater agents, light protection agents and thickeners such as for example, synthetic polymers with ionic and/or associative groups such as polyvinyl alcohol, poly(meth)acrylamide, poly(meth)acrylic acid, polyvinylpyrrolidone, hydrophobic modified ethoxylated polyurethanes or polyacrylates, cross-linked or non-cross-linked polymeric microparticles.

Water-based lacquers according to the invention may contain, for example, conventional lacquer solvents, for example in amounts of preferably less than 20 wt. %, particularly preferably less than 15 wt. %. These may be conventional lacquer solvents and may arise, for example, from preparation of the binder or be added separately. Examples of such solvents are monohydric or polyhydric alcohols, e.g. propanol, butanol, hexanol; glycol ethers or esters, e.g. diethylene glycol di-C1–C6-alkyl ethers, dipropylene glycol di-C1–C6-alkyl ethers, ethoxypropanol, butyl glycol; glycols, e.g. ethylene glycol and/or propylene glycol and their dimers or trimers, N-alkylpyrrolidones, such as e.g. N-methylpyrrolidone and also ketones such as methyl ethyl ketone, acetone, cyclohexanone; aromatic or aliphatic hydrocarbons, e.g. toluene, xylene or linear or branched aliphatic C6–C12 hydrocarbons.

Water-based base lacquers according to the invention have solids contents of, for example, 10 to 50 wt. %; in the case of water-based effect base lacquers this range is preferably 15 to 30 wt. %, for water-based monotone coloured base lacquers the solids content is preferably greater, for example 20 to 45 wt. %. The ratio by weight of pigment to binder in the water-based base lacquer is, for example, between 0.05:1 and 3:1; for effect water-based base lacquers the ratio is preferably, for example, 0.1:1 to 0.6:1 and for monotone coloured water-based base lacquers the ratio is preferably greater, for example 0.1:1 to 2.5:1, each with respect to the weight of solids. When calculating the ratio of pigment to binder, the sum of the proportions by weight of colour-providing pigments, effect pigments and fillers is compared with the sum of the proportions by weight of solid binder, solid paste resin and solid cross-linking agent in the final water-based base lacquer.

Aqueous base lacquers according to the invention are suitable for preparing multilayered lacquers, in particular colour and/or effect-providing two-layered lacquers in the motor vehicle sector. They are suitable for the initial lacquering and repair lacquering of motor vehicles, but they may also be used in other areas, e.g. plastics materials lacquering, in particular for lacquering motor vehicle parts.

Thus, the invention also provides a process for preparing two-layered lacquers by applying a water-based base lacquer according to the invention and a clear lacquer. The water-based base lacquers according to the invention may be applied to a wide variety of types of substrates. In general, these are metallic or plastics substrates. These are often pre-coated, i.e. plastics substrates may be provided with e.g. a plastics primer, metallic substrates generally have, for example, an electrodeposited primer and optionally an additional one or more lacquer layers such as e.g. a primer surfacer layer. Water-based base lacquers according to the invention are preferably applied by spraying in a dry layer thickness of 8 to 50 µm; for water-based effect base lacquers the dry layer thickness is preferably for example, 10 to 25 µm, for water-based monotone coloured base lacquers it is preferably higher, for example 10 to 40 µm. Application preferably takes place using a wet-on-wet process, i.e. after an evaporation phase, e.g. at 20 to 80° C., the water-based base lacquer layers are overpainted with a conventional clear lacquer in a dry layer thickness of preferably 30 to 60 µm and dried or cross-linked together with this at temperatures of, for example, 20 to 150° C. The drying conditions for two-layered lacquers consisting of water-based base lacquer and clear lacquer are governed by the clear lacquer system used. For repair purposes, for example, temperatures of 20 to 80° C. are preferred. For purposes of mass lacquering temperatures of more than 100° C., for example more than 110° C., are preferred. The formation of a bloom-like, milky film on the clear lacquer surface, which is often observed in the prior art, cannot be observed on multilayered lacquers prepared using water-based base lacquers according to the invention, even in the case of darker shades.

Suitable clear lacquers are basically any known clear lacquers or transparent pigmented surface coating agents. Either solvent-containing single component (1C) or two-component (2C) clear lacquers, water-dilutable 1C or 2C clear lacquers, powder clear lacquers or aqueous powder clear lacquer slurries may be used here. 2C polyurethane clear lacquers are preferably used to overpaint base lacquer layers prepared from water-based base lacquers according to the invention.

As a result of use according to the invention of polyethylene and/or polypropylene glycols and/or polyols in colour and/or effect providing water-based base lacquers known per se from the prior art, it is possible to lower the wetting limits of the clear lacquer surface coating agent applied to the base lacquer prepared therefrom. Another effect of use according to the invention of polyethylene and/or polypropylene glycols and/or polyols in water-based base lacquers is the increase in their sagging limit which may be of significance, for example, in the case of water-based base lacquers with those shades which have a low hiding power or in the case of water-based base lacquers with an increased tendency to sag, for example highly pigmented water-based base lacquers.

EXAMPLE 1

Preparation of a Monotone Red Multilayered Lacquer, Comparison a) Preparation of a Water-based Monotone Red Base Lacquer 10 parts of a 40 wt. % aqueous acrylate polyester dispersion, 40 parts of a commercial polyesterurethane dispersion (solids content 42 wt. %) and 8 parts of deionised water are blended under a dissolver. Then 6.5 parts of an acid acrylate thickener neutralised with dimethylethanolamine, 2 parts of a wetting agent, 3 parts of butyl glycol and 2 parts of N-methylpyrrolidone are stirred in to form a homogeneous mixture. 24.5 parts of an aqueous red pigment paste (ratio by weight of pigment/binder 2.2:1, solids content 43 wt. %) are admixed. Then the mixture is diluted with 4 parts of deionised water. A water-based monotone red base lacquer with a sagging limit of 24 µm is obtained.

b) Preparing the Multilayered Lacquer

Car body sheets (30×60 cm) which are pre-coated with commercially available cathodically depositable electrodeposition lacquer used in automobile mass lacquering (18 µm dry layer thickness) and commercially available primer surfacer (35 µm), is electrostatically lacquered with the water-based monotone red base lacquer from example 1a) in a dry layer thickness of 40 µm. After leaving to evaporate for 5 minutes at 80° C., a wedge-shaped clear lacquer layer consisting of a commercially available two-component PU clear lacquer is overpainted by spraying with a maximum dry layer thickness of 50 µm (wedge in longitudinal direction of the sheet). After leaving to evaporate for 5 minutes at room temperature, the coating is stoved for 30 minutes at 130° C. (object temperature). The longitudinal direction of the test sheet is in the vertical position during this process. The visually perceptible clear lacquer wetting limit is 23 µm.

EXAMPLE 2

Preparing a Monotone Red Multilayered Lacquer, According to the Invention a) Preparing a Water-based Monotone Red Base Lacquer 99 parts of the water-based monotone red base lacquer from example 1a) are blended with 1 part of polypropylene glycol (average molecular weight 2000). The sagging limit of the water-based base lacquer is 27 µm.

b) Preparing the Multilayered Lacquer

Example 1b) is repeated using the water-based monotone red base lacquer from example 2a). The visually perceptible clear lacquer wetting limit is 13 µm.

What is claimed is:

1. A process for coating an optionally precoated substrate with a two-layer coating comprising:

applying an aqueous base lacquer composition to said substrate by spray application; and applying a clear lacquer layer over said aqueous base lacquer composition;

wherein said aqueous base lacquer composition is comprising at least one polymer selected from the group consisting of linear polyethylene oxide homopolymers, branched polyethylene oxide homopolymers, linear polypropylene oxide homopolymers, branched polypropylene oxide homopolymers, linear polyethylene/polypropylene oxide copolymers with randomly distributed ethylene oxide and propylene oxide units, branched polyethylene/polypropylene oxide copolymers with randomly distributed ethylene oxide and propylene oxide units, wherein said polymers have terminal hydroxyl groups and optionally are partly or completely etherified with C1–C4-alkanols;

wherein said polymers have an average molecular weight from more than 1,000 to 8,000;

further wherein said aqueous base lacquer composition has a solids content comprising 0.5–15% of said polymers;

whereby said clear lacquer achieves a reduced wetting limit.

2. The process according to claim 1, wherein the aqueous base lacquer composition is further comprising at least one film-forming binder selected from the group consisting of polyester resins, polyurethane resins, poly(meth)acrylate resins, and mixtures thereof.

3. The process according to claim 1, wherein the aqueous base lacquer composition is further comprising at least one component selected from the group consisting of pigments, fillers, cross-linking agents, organic solvents, and conventional lacquer additives.

4. The process according to claim 1, wherein the substrate is a motor vehicle or parts thereof.

5. The process according to claim 1, wherein the polymers have an average molecular weight range from 2,000 to 8,000.

6. The process according to claim 5, wherein the aqueous base lacquer composition is further comprising at least one film-forming binder selected from the group consisting of polyester resins, polyurethane resins, poly(meth)acrylate resins, and mixtures thereof.

7. The process according to claim 5, wherein the aqueous base lacquer composition is further comprising at least one component selected from the group consisting of pigments, fillers, cross-linking agents, organic solvents, and conventional lacquer additives.

8. The process according to claim 5, wherein the substrate is a motor vehicle or part thereof.

9. An aqueous base lacquer composition comprising at least one polymer selected from the group consisting of linear polyethylene oxide homopolymers, branched polyethylene oxide homopolymers, linear polypropylene oxide homopolymers, branched polypropylene oxide homopolymers, linear polyethylene/polypropylene oxide copolymers with randomly distributed ethylene oxide and propylene oxide units, branched polyethylene/polypropylene oxide copolymers with randomly distributed ethylene oxide and propylene oxide units, wherein said polymers have terminal hydroxyl groups and optionally are partly or completely etherified with C1–C4-alkanols;

wherein said polymers have an average molecular weight from more than 1,000 to 8,000;

further wherein said aqueous base lacquer composition has a solids content comprising 0.5–15% of said polymers;

whereby said aqueous base lacquer composition enables a clear lacquer having a reduced wetting limit to be applied over said aqueous base lacquer composition.

10. The aqueous base lacquer composition according to claim 9, further comprising at least one film-forming binder selected from the group consisting of polyester resins, polyurethane resins, poly(meth)acrylate resins, and mixtures thereof.

11. The aqueous base lacquer composition according to claim 9, further comprising at least one component selected from the group consisting of pigments, fillers, cross-linking agents, organic solvents, and conventional lacquer additives.

12. The aqueous lacquer composition according to claim 9, wherein the polymers have an average molecular weight range from 2,000 to 8,000.

13. The aqueous lacquer composition according to claim 12, further comprising at least one film-forming binder selected from the group consisting of polyester resins, polyurethane resins, poly(meth)acrylate resins, and mixtures thereof.

14. The aqueous lacquer composition according to claim 12, further comprising at least one component selected from the group consisting of pigments, fillers, cross-linking agents, organic solvents, and conventional lacquer additives.

15. A substrate coated with an aqueous base lacquer composition according to claim 9.

16. The substrate according to claim 15, wherein said substrate is a motor vehicle or part thereof.

17. A substrate coated with an aqueous base lacquer composition according to claim 12.

18. The substrate according to claim 17, wherein said substrate is a motor vehicle or part thereof.

* * * * *